2,993,886
AZO DYESTUFFS AND PROCESS AND COMPOSITIONS FOR THE DYEING OF AROMATIC POLYESTER FIBRES
Konrad Weis, Leverkusen, and Helmut Kleiner, Koln-Stammheim, Germany, assignors to Farbenfabriken Bayer Aktiengesellschaft, Leverkusen, Germany, a corporation of Germany
No Drawing. Filed Nov. 18, 1958, Ser. No. 774,591
Claims priority, application Germany Nov. 25, 1957
1 Claim. (Cl. 260—163)

The present invention relates to new azo dyestuffs and to a process for their manufacture. It further relates to a process and to compositions for the dyeing of aromatic polyesters, acetate rayon and synthetic polyamides. More particularly the invention relates to azo dyestuffs having the following general formula

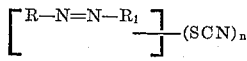

In this formula R means the residue of a diazo compound of the benzene series, $R_1$ stands for the radical of a coupling component of the pyrazolone series, R and $R_1$ being free of sulfonic and carboxylic acid groups, and $n$ means a whole number from 1 to 2.

The new dyestuffs are obtainable when a diazo compound of the benzene series is coupled in neutral to alkaline medium with a pyrazolone coupling component, and if these components are chosen so that they contain no sulfonic acid and carboxylic acid groups but together contain one or two aromatically linked thiocyanate groups.

In some cases, the new dyestuffs are obtained even when the preparation does not start with intermediate products containing thiocyanate groups but when the thiocyanate groups are introduced into the preformed dyestuff.

During application of the first-mentioned process, the starting components should not contain any sulfonic acid or carboxylic acid groups, but should contain altogether one or two thiocyanate groups linked to the nucleus. This may be present in the diazo compounds and also in the coupling components. In addition, the usual substituents in azo dyestuffs, with the exception of sulfonic acid and carboxylic acid groups, may be contained, such as alkyl, alkoxy, hydroxyalkoxy, hydroxyalkyl, alkoxyalkyl, hydroxyalkyloxyalkyl, halogenoalkyl, cyanoalkyl, trifluoromethyl, halogeno, cyano, hydroxy, oxo, nitro, alkylsulfone carboxylic acid ester, azo-, carboxylamide, and sulfonamide groups.

The preparation of the intermediate products or end products containing thiocyanate groups in the nucleus can be carried out according to known methods, for example according to the process of German patent specifications Nos. 491,225 and 493,025 by introduction of thiocyanate by alkali metal thiocyanate in the presence of halogen or by the direct action of thiocyanogen. For the preparation of the thiocyanate compounds, the exchange of labile aromatically linked halogen atoms for thiocyanate by the action of sodium thiocyanate is also possible.

Diazo components suitable for the process are, for example:
1-amino-4-thiocyanobenzene, 1-amino-2-chloro-4-thiocyanobenzene, 1-amino-2,6-dibromo-4-thiocyanobenzene, 1-amino-2-methyl-4-thiocyanobenzene, 1-amino-2-nitro-4-thiocyanobenzene, 1-amino-2-methoxy-4-thiocyanobenzene, 4-amino-4'-thiocyano-1,1'-azobenzene, 1-amino-3-cyano-benzene, 4-aminobenzaldehyde, 4-aminobenzoic acid methyl ester, 1-amino-2,4-dichlorobenzene, 1-amino-2-trifluoromethyl-5-chlorobenzene, 1-amino-2-methoxybenzene-5-ethylsulfone, 1-amino-2-methylbenzene-5-sulfonic acid-dimethylamide, 1-amino-2-chloro-4-nitrobenzene, 1-amino-2,6-dichloro-4-nitrobenzene, 1-amino-2-methoxy-4-nitrobenzene, 1-amino-2-cyano-4-nitrobenzene, 1-amino-3-cyanomethylbenzene, 1-amino-2-methoxy-5-cyanomethylbenzene, 1-amino-2,4-dibromobenzene.

As coupling components, there may be used, for example:
1-phenyl-3-methyl-5-pyrazolone, 1-(4'-thiocyanophenyl)-3-methyl-5-pyrazolone, 1-(tetrahydrothiophene-S-dioxide-[3'])-3-methyl-5-pyrazolone, 1-(2'-chlorophenyl)-3-methyl-pyrazolone-(5), 1-(2'-cyanoethyl)-3-methyl-pyrazolone-(5), 3-methyl-pyrazolone-(5).

The novel dyestuffs are suitable for dyeing of acetate rayon, of synthetic polyamide and aromatic polyester fibres. When dyed according to the usual processes of disperse dyeing, they yield on these materials dyeings of good fastness to sublimation, wetting and light.

By the expression aromatic polyesters there is understood the highly polymeric esters obtainable by heating polyethylene glycols having a chain of 2 to 10 carbon atoms, with terephthalic acid or with an ester-forming derivative thereof such as an aliphatic or an aryl ester, an acid halide or an ammonium salt.

The definition of synthetic polyamide materials is likewise well known from literature.

The following examples are given for the purpose of further illustrating the invention without, however, limiting it thereto. The parts by weight and the parts by volume stand in the ratio of grams to millilitres.

*Example 1*

23.5 parts by weight of 1-amino-2,4-dichlorobenzene are diazotised by the usual method and coupled with 35.5 parts by weight of 1-(4'-thiocyanophenyl)-3-methyl-5-pyrazolone in a soda alkaline medium. The dyestuff is finely divided by acidification in presence of a dispersing agent, and separated. When dyed onto polyester fibre, a bright yellow is obtained.

1% of the dyestuff (referred to the weight of material to be dyed) is finely divided with a dispersing agent, for example with di-naphthyl-methane-sulfonate.

Aromatic polyester material, e.g. polyethylene terephthalate fiber, is dyed at the boil for 1 hour with this dispersion, with addition of a carrier, for instance benzoic acid or cresotic acid methyl ester. There is obtained a yellow dyeing on the material, which is very fast to wetting, sublimation, and light.

Another very fast yellow dyeing on acetate rayon is obtained when the fibre material is dyed at about 70° C. for 1 hour with 1% of the finely divided dyestuff (referred to the weight of material to be dyed) with addition of about 3 g./litre of Marseille soap.

A very fast dyeing of polyamide fibre, the shade obtained is almost the same as the above mentioned dyeings, is produced by dyeing at about 100° C. for 1 hour with 1% of the finely divided dyestuff (referred to the weight of polyamide fibre) with addition of a paraffin sulfonate.

By an analogous method, dyestuffs can be prepared from the diazo and azo components listed in the following table which dye acetate rayon, polyester and polyamide fibres in almost the same shades; for the sake of simplicity, the survey mentions the shades only on one type of fibre in each case. The dyeings exhibit excellent fastness to wetting and sublimation, and good to very good fastness to light.

| No. | Diazo Component | Azo component | Shade | Type of fibre |
|---|---|---|---|---|
| (2) | 1-Amino-4-thiocyanobenzene. | 1-phenyl-3-methyl-5-pyrazolone. | yellow | Polyester. |
| (3) | 1-Amino-2-chloro-4-thiocyanobenzene. | 1-(tetrahydrothiophene-S-dioxide-]3'])-3-methyl-5-pyrazolone. | greenish yellow | Do. |
| (4) | 1-Amino-2-methyl-4-thiocyanobenzene. | 1-(2-cyanoethyl)-3-methyl-pyrazolone-5. | do | Do. |
| (5) | 1-Amino-2-nitro-4-thiocyanobenzene. | 3-methyl-pyrazolone-5. | yellow | Polyamide. |
| (6) | 1-Amino-4-thiocyanobenzene. | 1-(2'-chlorophenyl)-3-methyl-pyrazolone-(5). | greenish yellow | Polyester. |
| (7) | 1-Amino-2-methyl-4-thiocyanobenzene. | 1-phenyl-3-methyl-pyrazolone. | do | Acetate rayon. |

We claim:
The azo dyestuff corresponding to the formula

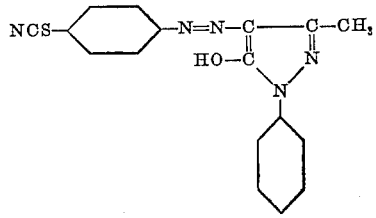

References Cited in the file of this patent
UNITED STATES PATENTS

| | | |
|---|---|---|
| 2,126,468 | Holzach et al. | Aug. 9, 1938 |
| 2,134,035 | Ellis | Oct. 25, 1938 |
| 2,217,693 | McNally et al. | Oct. 15, 1940 |
| 2,430,484 | Strain et al. | Nov. 11, 1947 |
| 2,512,251 | Kleene | June 20, 1950 |